Patented July 23, 1946

2,404,576

UNITED STATES PATENT OFFICE 2,404,576

PREVENTION OF FORMATION OF COLORS IN THIOCYANATES

William H. Hill and James H. F. Veltman, Mount Lebanon, Pa., assignors, by mesne assignments, to Koppers Company, Incorporated, Pittsburgh, Pa., a corporation of Delaware No Drawing. Application April 18, 1944,
Serial No. 531,644

11 Claims. (Cl. 23—75)

The present invention relates in general to the production of stable, colorless thiocyanates, and has reference more particularly to prevention of the discoloration of ammonium thiocyanate which has been manufactured from the gases produced by the destructive distillation of coal and found particularly in the scrubbing liquors used in refining coke oven gas.

In the manufacture, distribution, and use of thiocyanates, there has often been observed in these salts a formation of reddish color varying in intensity from faint pink to deep red. Troublesome dyes or colored solutions often are found in the crude thiocyanate solutions associated with coke oven gas purification liquors. Even though purification steps, such, for example, as ammoniating and sulphiding the thiocyanate solution, filtering off insoluble iron sulphide and thereafter treating the thiocyanate filtrate with activated carbon have been employed in crystallization to provide a clear, colorless crystalline product, discoloration of the so-produced colorless salt will nevertheless occur in storage and especially will it do so when the salt is exposed to natural or artificial light.

An object of the present invention is to provide economical means of producing a clear, colorless purified thiocyanate salt that is color stable in spite of protracted storage, exposure to light or contact with iron.

A further object of the present invention is to prevent that discoloration of clear-white purified thiocyanates which occurs upon storage.

It is a further object of the present invention to provide a colorless, technical thiocyanate that is not only inhibited against the above-described discoloration but is also of such strengthened, crystal structure as materially to prevent size degradation of the salt during handling, or the like.

The invention has for further objects such other improvements and such other operative advantages or results as may be found to obtain in the processes or apparatus hereinafter described or claimed.

According to the present invention thiocyanates such for example as ammonium, sodium, potassium, barium, calcium, guanidine, and other organic amino thiocyanates are stabilized against color changes by addition thereto of small quantities of one or more of certain inhibitors which have been found to prevent discoloration of the thiocyanates. These inhibitors include compounds of formic, oxalic and malonic acids, and are selected from the group consisting of water-soluble mono- and di-carboxylic acids of relatively low molecular weight. As is often to be observed in chemical phenomena, the leading members of the group exhibit most strongly the common characteristic, which in the present case is their capacity in small quantities in thiocyanates to prevent discoloration of the latter. Thus, formic acid and its salts are especially beneficial as inhibitors and appear to lend the greatest stability to stored thiocyanates.

Unless free alkalinity exists in the thiocyanate solution to which coloration-inhibitor is to be added, the salts of the above-mentioned inhibitors rather than the acids themselves are preferably employed in order to avoid any deleterious effect of the acid upon the so-treated thiocyanate, such effect being, for example, the formation of yellow, perthiocyanic acid. The selected salts are preferably those having the same cation as the thiocyanate being treated, thereby to reduce the total amount of impurities so-added to the technical salt.

The addition of such inhibitors can be made at any time during or after the manufacture of the thiocyanates, and even if the salt is discolored prior to the present treatment, an addition of one or more of the above-mentioned inhibitors will cause a material lightening of the said discolored salt. However, addition of the inhibitor is preferably made to the crude thiocyanate solution prior to crystallization, whereby a more intimate mixture and a more thorough distribution of inhibitor compound throughout the subsequently formed crystal is obtained thus providing more comprehensive protection of the inhibited product.

In the hereinafter described examples illustrating the present invention, the thiocyanate salt that has been employed for test purposes is an ammonium thiocyanate obtained in impure state in approximately 30% solution by the scrubbing of coke-oven gas with an aqueous suspension of sulphur. The said thiocyanate solution, which often contains some iron and other impurities such, for example, asthiosulphates, can be purified and concentrated according to known procedure to produce a colorless, technical thiocyanate of at least 95% purity. The so-produced salt, however, soon discolors in storage and darkens with especial rapidity in sunlight or in contact with iron. Since the said thiocyanate solution of the following examples is slightly ammoniacal, the inhibiting anions can be added directly in acid form and the acid will be neutralized by the said solution.

The following are examples of treatment of thiocyanate salts with discoloration inhibitor whereby purified colorless thiocyanates will retain their colorless appearance on storing.

Example 1

To a technical ammonium thiocyanate of about 30% salt concentration such as is produced at by-product coke-plants by scrubbing the gas coming from the primary coolers with a suspension of sulphur there was added 1.5% ammonium formate, 2% ammonia and 1% hydrogen sulphide, the percentages being based on the net weight of ammonium thiocyanate contained in solution. The so-treated solution was heated to 110° C., treated with 2% Darco G-60 by weight of the said ammonium thiocyanate and filtered. The solution was evaporated to a boiling temperature of 128° C. and then filtered to remove precipitated impurities. Upon cooling clear-white crystals of ammonium thiocyanate were obtained which proved color stable for more than a year.

Example 2

Each of the hereinbelow listed inhibitors were added to samples of 30% crude ammonium thiocyanate liquor, the various weights thereof which were added being chemically equivalent. To the solutions were then added 2% ammonia and 1% hydrogen sulphide. After standing for one hour the solutions were filtered. The filtrates were heated to 110° C., treated with 2% by weight of G-60 Darco and filtered. After cooling of the solutions and crystallization of ammonium thiocyanate therefrom, the crystals were filtered off, placed in closed jars and exposed to daylight. During the ensuing test period, the relative resistances to discoloration of the variously inhibited ammonium thiocyanate crystals were compared.

Example 2.—Table

| Inhibitor added | Weight in per cent of dry NH₄SCN | Color of NH₄SCN crystals as obtained | Color after approximately five months' exposure to daylight |
|---|---|---|---|
| None | | White | Red-brown. |
| Ammonium formate | 1.58 | do | White. |
| Malonic acid | 1.30 | do | Yellow-white. |

In all the above examples the weight of inhibitor remaining in each batch of crystals after filtration and crystallization of the treated solution was materially reduced, for example in one case where 0.70% of formic acid was added to the solution, less than one-tenth of one-percent inhibitor, by weight of product, was found in the salt. In every case, in fact, where analysis was made of the inhibitor content of color-stabilized salt, the inhibitor concentration was found to be less than 0.1% by weight. It is apparent, therefore, that the so-added inhibitors are not present in the treated thiocyanate to an extent sufficient to affect the standard of purity for technical thiocyanates.

Example 3

A technical ammonium thiocyanate (95 percent) of deep brown-red color was tumbled in a glass jar for about five minutes with 1.5% acid ammonium oxalate by weight of said thiocyanate. The color of the salt was reduced to a light greenish yellow.

It has been discovered during the development of the present invention that, when small amounts of the above-mentioned inhibitors are added to thiocyanates before or during crystallization, the habitus of crystallization is so altered that a marked change in the physical appearance of the thiocyanate salt is obtained. It again appears that the first members of the chemical groups from which the inhibitors have been selected are the most effective and this is especially true of formic acid, a notable example being provided by the addition of 0.70% formic acid to ammonium thiocyanate solution during crystallization of the salt therefrom. Sparkling, colorless crystals were obtained which had several times the thickness of untreated ammonium thiocyanate crystals, and which were uniform in size and homogeneous in structure, and exhibited no marked cleavage planes which could permit ready fracture. These so-produced crystals were stored in the presence of light for more than a year, and were subjected to intermittent handling, but at the conclusion of the test they nevertheless retained their original size and exhibited the same sparkling, clear-white appearance.

The term "alkali thiocyanate" as employed in the claims hereinafter made is intended to encompass not only the thiocyanates of the fixed alkali metals such, for example, as sodium and potassium, but also the thiocyanate of ammonia, which is sometimes termed "volatile alkali."

The invention as hereinabove set forth is embodied in particular form and manner but may be variously embodied within the scope of the claims hereinafter made.

We claim:

1. Colorless technical ammonium thiocyanate containing more than about 0.1% and less than about 1% by weight of a discoloration inhibitor selected from the group consisting in the anions of water-soluble mono- and di-carboxylic acids of relatively low molecular weight.

2. Colorless technical ammonium thiocyanate containing more than about 0.1% and less than about 1% by weight, as a discoloration inhibitor, of an anion of a water-soluble carboxylic acid of relatively low molecular weight.

3. Colorless technical ammonium thiocyanate containing a discoloration inhibitor selected from the group consisting in the anions of water-soluble mono- and di-carboxylic acids of relatively low molecular weight.

4. Colorless technical ammonium thiocyanate containing more than about 0.1% and less than about 1% by weight, as a discoloration inhibitor, of a salt of formic acid.

5. Colorless technical ammonium thiocyanate containing more than about 0.1% and less than 0.7% by weight of ammonium formate.

6. A method for preventing the discoloration of colorless, technical alkali thiocyanates, said method comprising the steps of: purifying crude thiocyanate salt and decolorizing the same; and injecting into said salt prior to crystallization minute quantities of a discoloration inhibitor selected from the group consisting in the anions of water-soluble mono- and di-carboxylic acids of relatively low molecular weight.

7. A method for preventing the discoloration of colorless, technical-grade, alkali thiocyanates, said method comprising the steps of: purifying crude alkali thiocyanate and decolorizing the same; and injecting into said salt small quantities of a discoloration inhibitor comprising the R salt having an anion that is selected from the group consisting in the anions of water-soluble mono- and dicarboxylic acids of relatively low molecular weight, where R is the cation of the treated thiocyanate salt.

8. A method for preventing the discoloration of colorless, technical ammonium thiocyanate, said method comprising the steps of: purifying crude ammonium thiocyanate and decolorizing the same; and injecting into said salt minute quantities of ammonium formate.

9. A method for producing clear, colorless ammonium thiocyanate crystals that are stabilized against color change by storage, contact with metal, sunlight, and like discolorants, said method comprising: treating crude ammonium thiocyanate solution with ammonia and hydrogen sulphide and thereafter filtering off precipitates; heating so-derived filtrate and treating the same with activated carbon; removing said carbon from so-treated thiocyanate solution; adding to the thiocyanate solution a salt of formic acid; and crystallizing from the so-treated solution clear, colorless ammonium thiocyanate crystals containing the said formate in quantity at most less than 1% by weight of the ammonium thiocyanate.

10. A method for stabilizing colorless, technical grade ammonium thiocyanate against discoloration and size degradation during handling, storage, and the like, said method comprising: purifying crude ammonium thiocyanate and decolorizing the same; adding to aqueous solution of said thiocyanate, as a discoloration inhibitor, small quantities of a compound having as its anion the anion of a mono-carboxylic acid of less than four carbon atoms; and thereafter crystallizing from said solution, colorless ammonium thiocyanate containing by weight thereof less than about 1% of the said added inhibitor.

11. A method for preventing the discoloration of colorless, technical ammonium thiocyanate, said method comprising the steps of: purifying crude ammonium thiocyanate and decolorizing the same; and injecting into the said salt small quantities of a compound containing as an active agent the formic acid anion.

WILLIAM H. HILL.
JAMES H. F. VELTMAN.